Jan. 20, 1931.  B. H. REEVES  1,789,882
MACHINE FOR MAKING INSULATED WIRE
Filed Jan. 19, 1927   7 Sheets-Sheet 3
Fig. 2ᴬ.
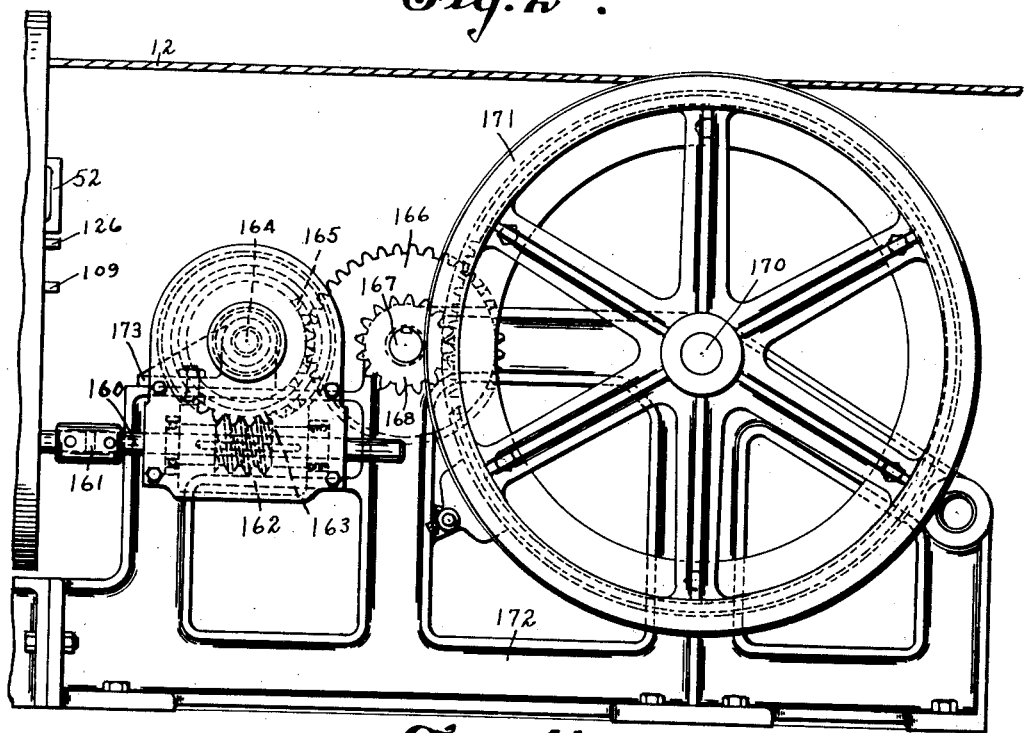
Fig. 4ᴬ.
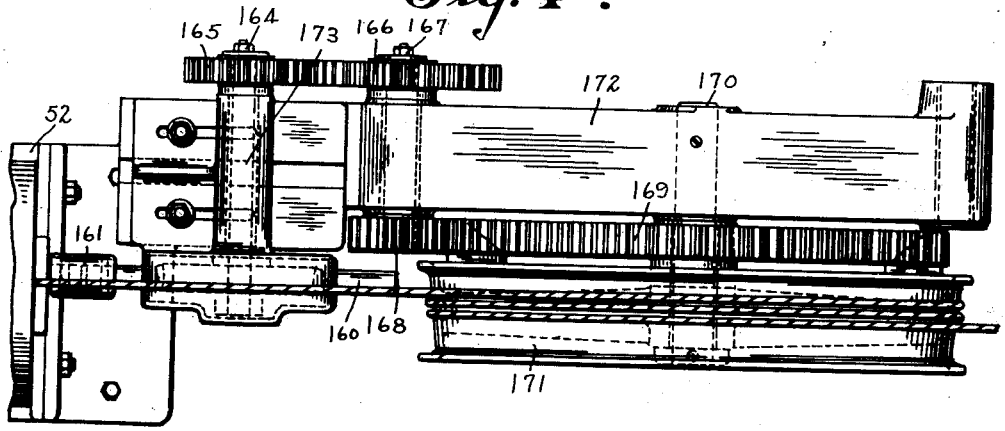
Inventor
Beauford H. Reeves
By Henry E. Pocknell
Attorney

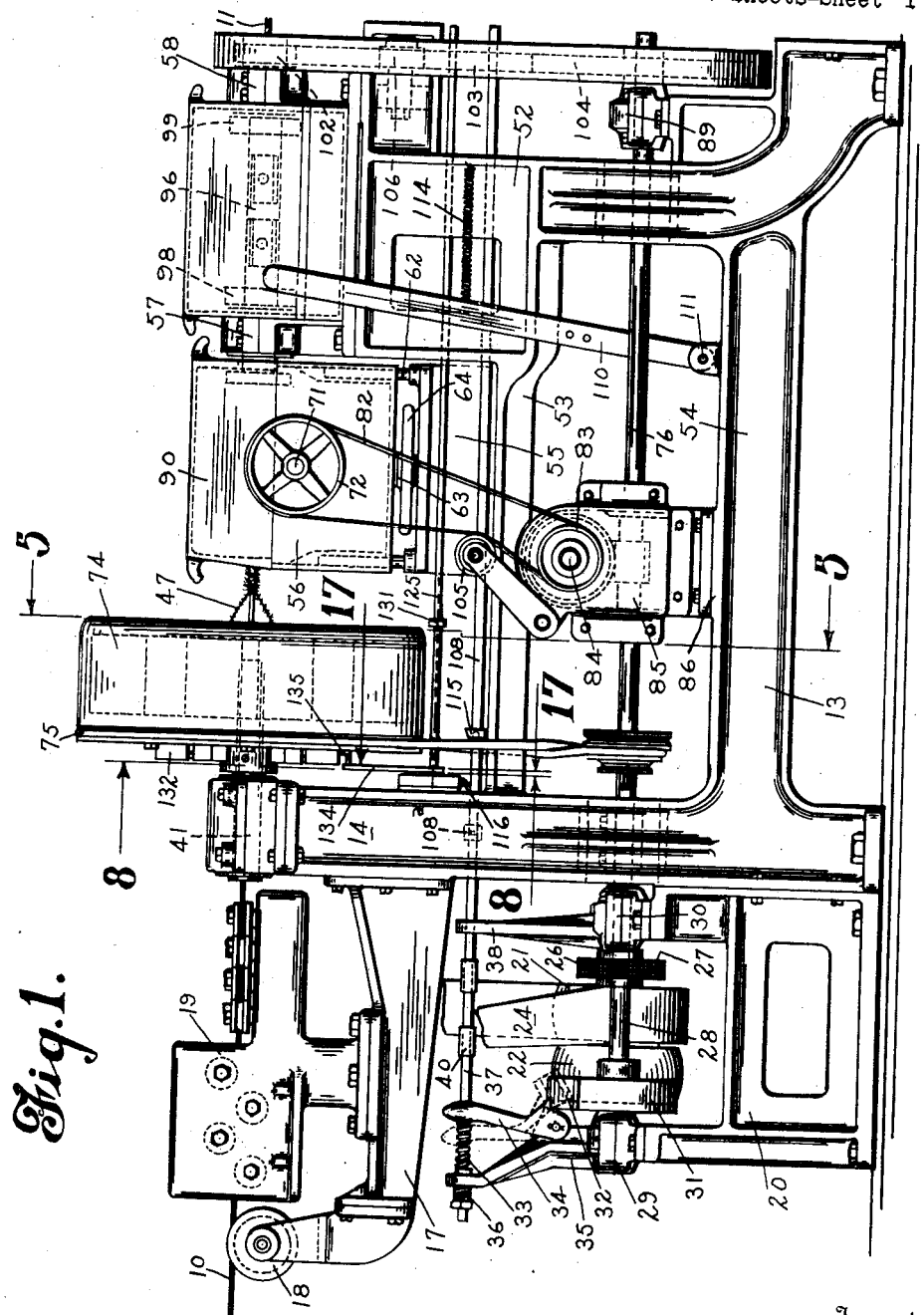

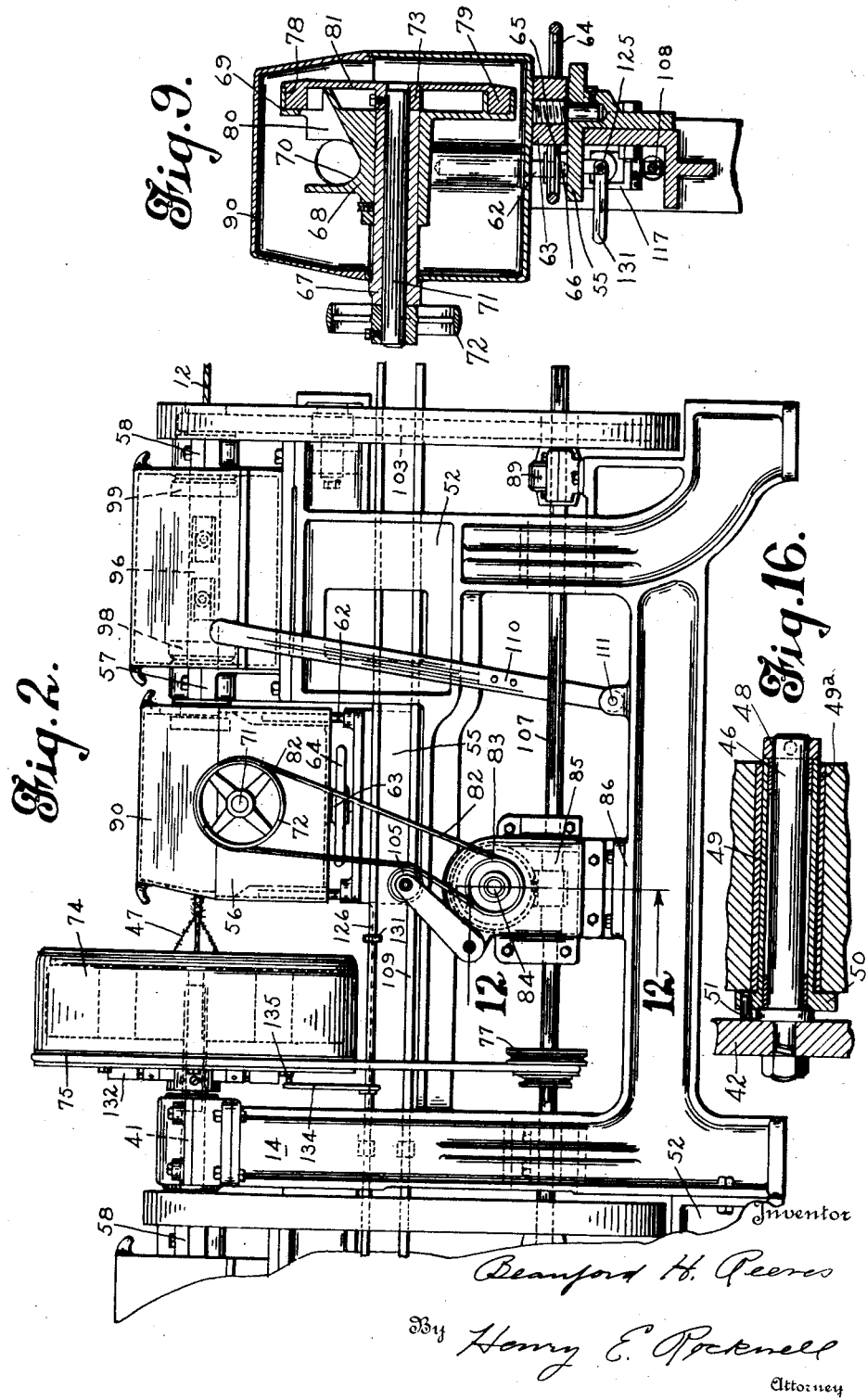

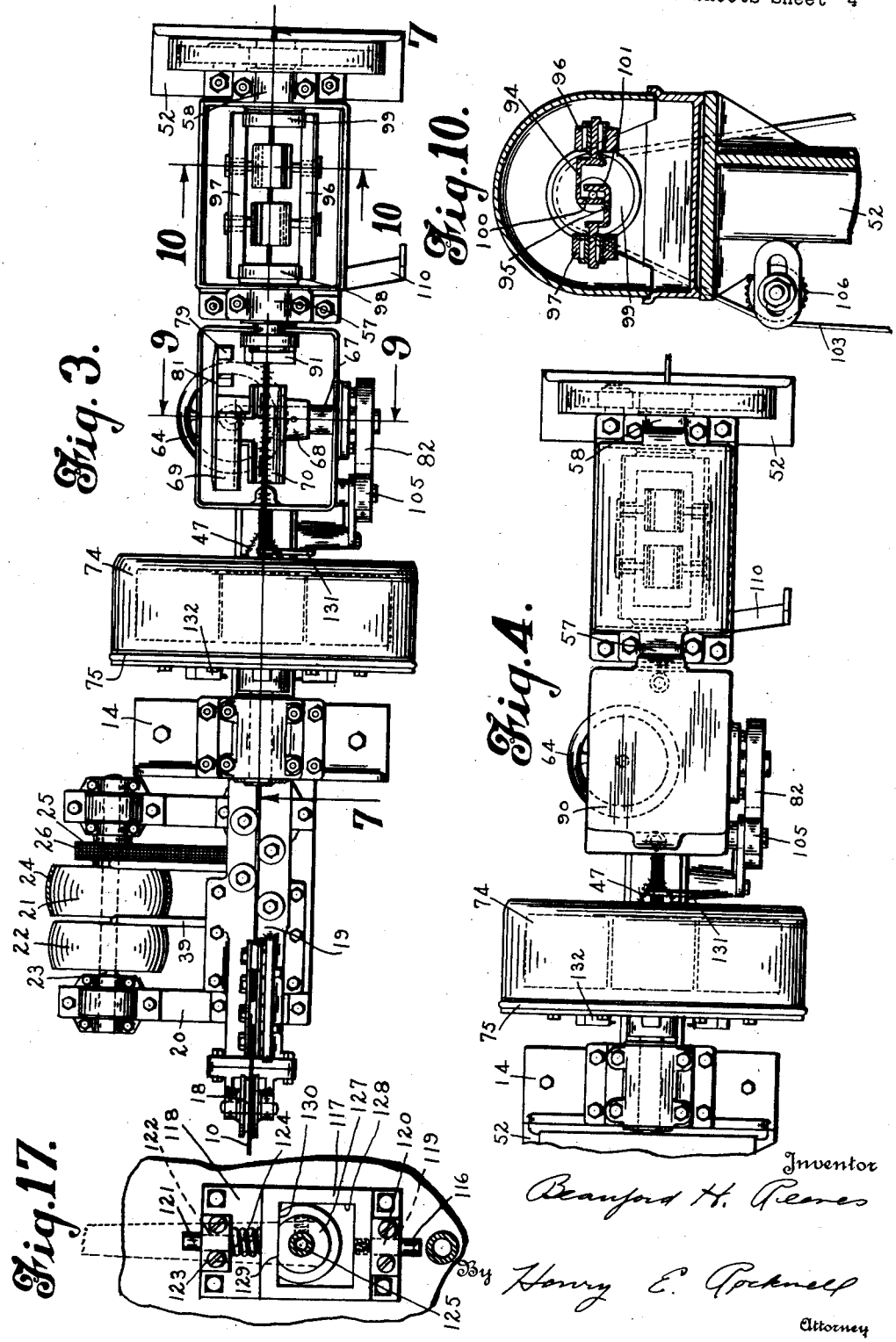

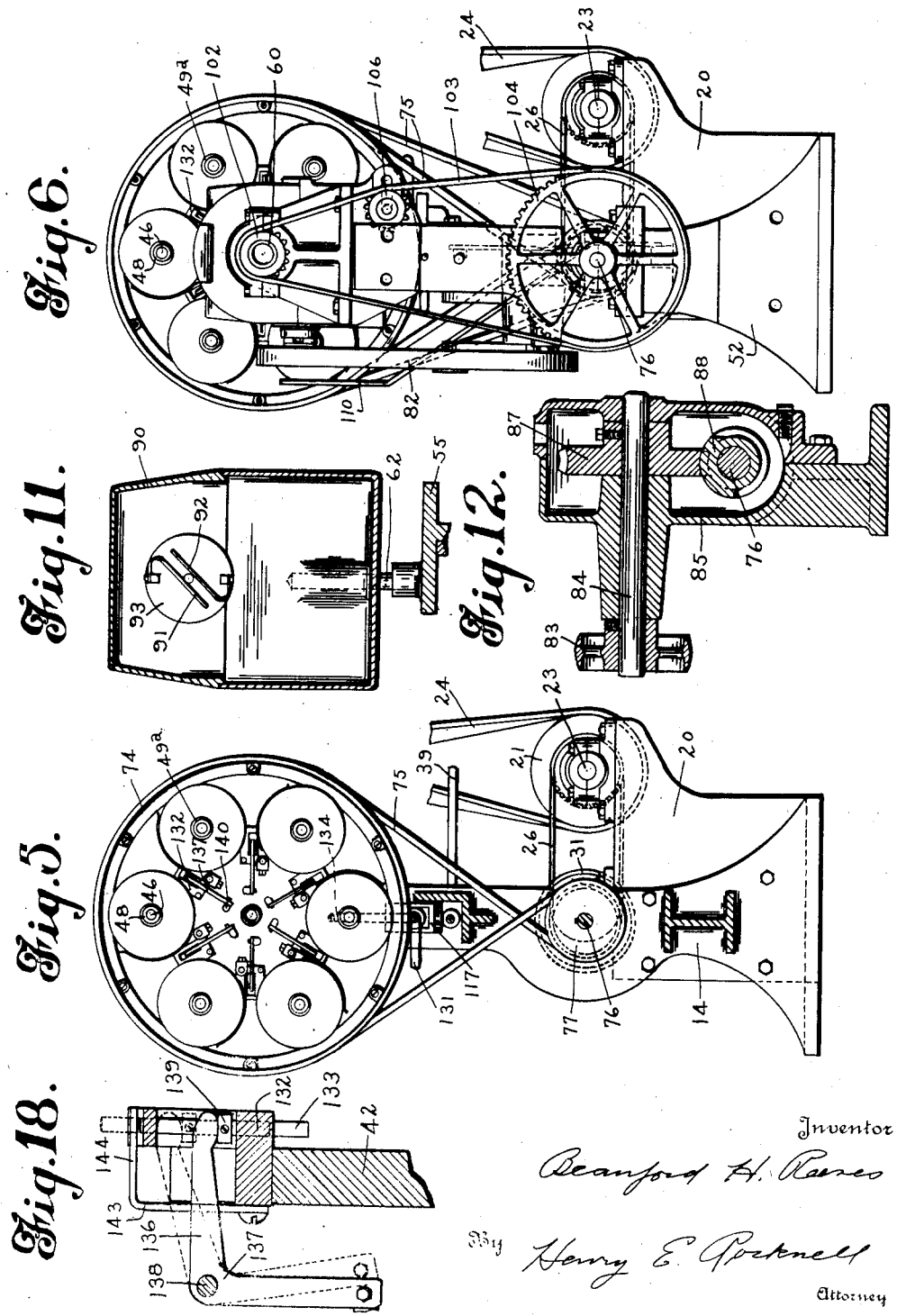

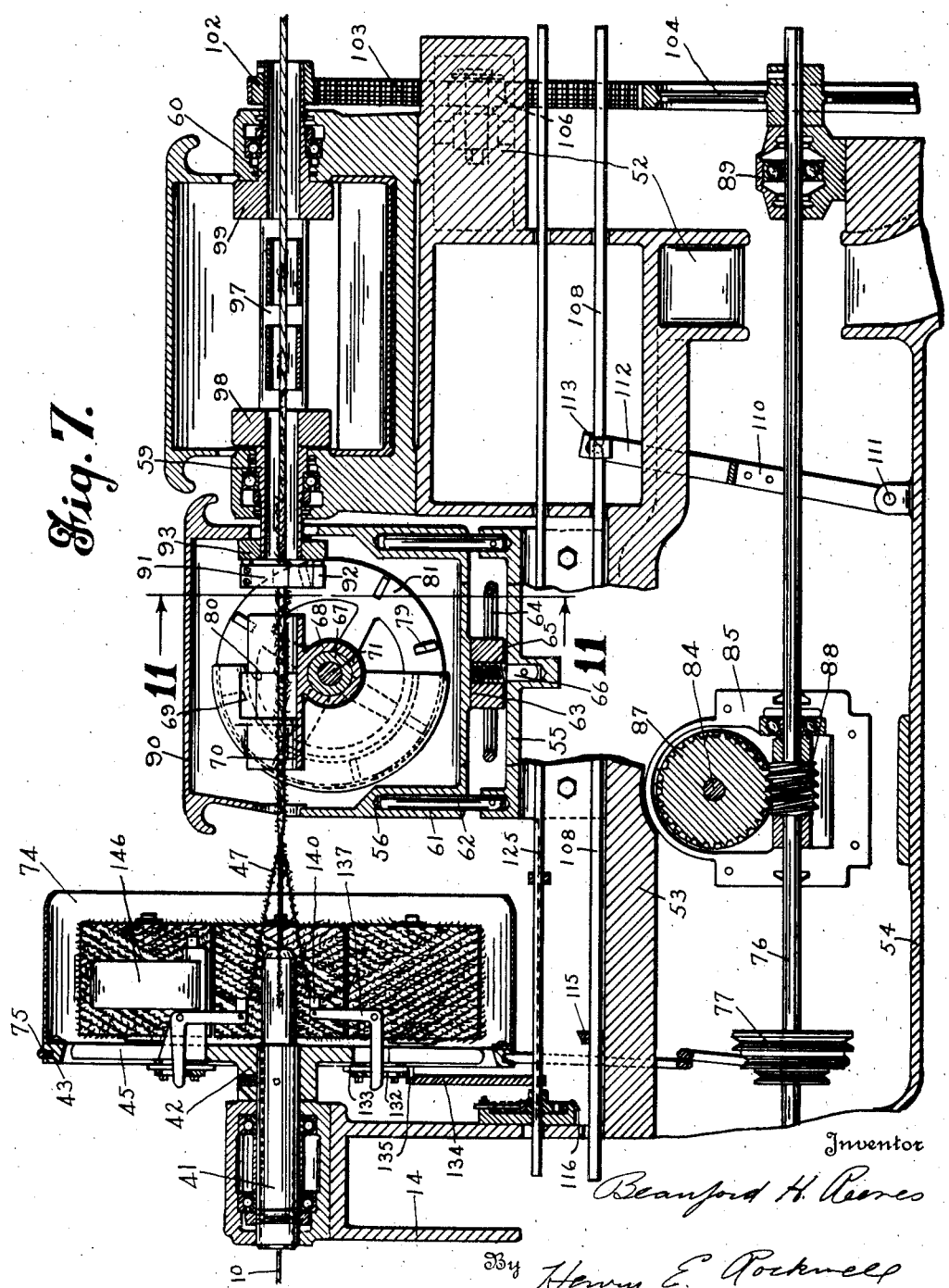

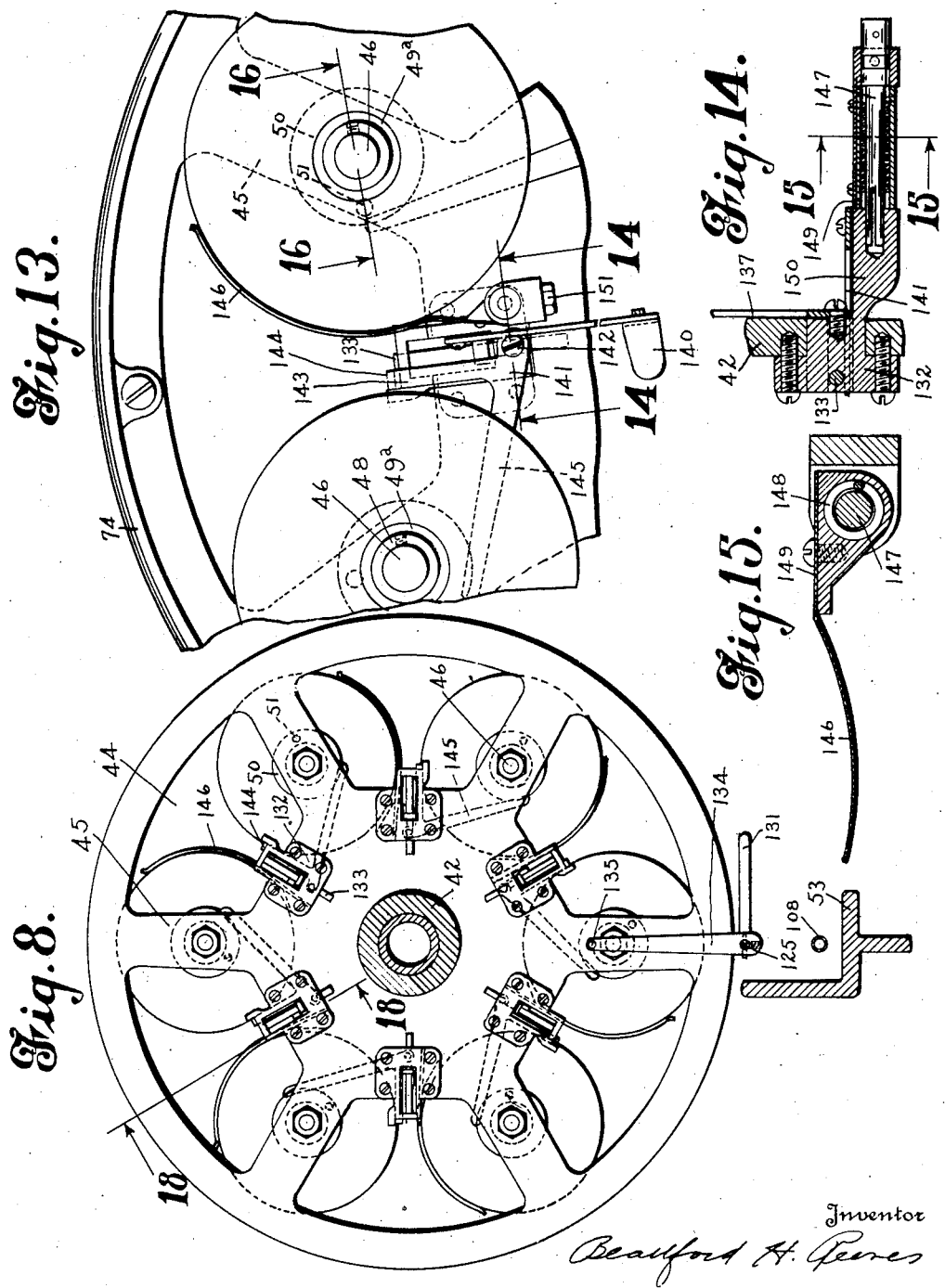

Patented Jan. 20, 1931

1,789,882

UNITED STATES PATENT OFFICE

BEAUFORD H. REEVES, OF NEW HAVEN, CONNECTICUT, ASSIGNOR TO ROCKBESTOS PRODUCTS CORPORATION, OF NEW HAVEN, CONNECTICUT

MACHINE FOR MAKING INSULATED WIRE

Application filed January 19, 1927. Serial No. 162,169.

This invention relates to machines for making insulating coverings for electrical conductors or the like. More especially the invention relates to machines adapted to form an insulating covering in such a manner that the same will be substantially a one-piece structure, regardless of the length of the wire, and that the covering will be of substantially uniform thickness about the conductor.

The insulating machines generally in use prior to this invention, covered a conductor with insulating material of various kinds by winding, braiding, and other similar operations. These operations were generally time consuming inasmuch as in many instances more than one layer of material was required to properly insulate the conductor, and each layer required a separate machine to apply the same. The design of the machines used, was such that only a limited length of conductor could be covered at one adjustment thereof, after which the conductor was severed, the machine readjusted and the conductor ends rejoined. Insulating coverings made by previous machines wherein the strands of the covering were helically wound upon the conductor, had the disadvantage of a tendency for the strands to separate when the covered conductor was sharply bent, which destroyed the insulating qualities thereof.

The principal object of this invention is to provide an improved machine for use in covering a conductor or the like, with an insulating material which preferably comprises a loose, untwisted roving or rovings of thread reinforced fibres, and wherein these rovings are wound upon the conductor in a novel manner, and then bound together with a binding compound, compressed, and smoothed into a dense mass of intermingled fibres, thereby forming a substantially one-piece structure.

Another object of this invention is to provide an improved machine which will accomplish the above result without interrupting the continuity of the conductor, or the operation of covering the same except to provide additional supplies of suitable roving.

Another object of this invention is to provide an improved machine which will perform the above operations economically and efficiently, and wherein the conductor will not be excessively handled or acted upon in such a manner that there will be a tendency to destroy its electrical conductivity and mechanical strength.

Still another object of this invention is to provide in a machine of this type, an improved form of holder for receiving cheeses or cops of stranded material.

Still another object of this invention is to provide in a machine of this type, automatic stop mechanism operable to stop the machine when any one of the strands of insulating material breaks during the operation thereof.

A further object of this invention is to provide in a machine of this type, an improved form of binding compound applying mechanism.

A further object of this invention is to generally improve machines of this type, whereby the operating efficiency thereof will be increased and the product therefrom will be of comparatively high quality.

To these and other ends, this invention consists in the novel features and combinations of parts to be hereinafter described and claimed.

In the accompanying drawings:

Fig. 1 is a front elevation of a section of a machine, embodying the features of my invention;

Fig. 2 is a front elevation of an adjacent section of the machine;

Fig 2A is a front elevation of a third section of the machine;

Fig. 3 is a top plan view of the parts shown in Fig. 1.

Fig. 4 is a top plan view of the parts shown in Fig. 2.

Fig 4A is a top plan view of the parts shown in Fig. 2A;

Fig. 5 is a section on line 5—5 of Fig. 1;

Fig. 6 is a right hand end view of the adjacent section shown in Figs. 1 and 2 respectively, as assembled;

Fig. 7 is a section on line 7—7 of Fig. 3;

Fig. 8 is a section on line 8—8 of Fig. 1;

Fig. 9 is a section on line 9—9 of Fig. 3;

Fig. 10 is a section on line 10—10 of Fig. 3;
Fig. 11 is a section on line 11—11 of Fig. 7;
Fig. 12 is a section on line 12—12 of Fig. 2;
Fig. 13 is an enlarged end face view of a portion of one of the cop or cheese holders;
Fig. 14 is a section on line 14—14 of Fig. 13;
Fig. 15 is a section on line 15—15 of Fig. 14;
Fig. 16 is a section on line 16—16 of Fig. 13;
Fig. 17 is a section on line 17—17 of Fig 1, and
Fig. 18 is a section on line 18—18 of Fig. 8.

The machine selected to illustrate the features of my invention, is adapted to cover a conductor or the like 10, with an insulating covering which, in this instance, consists of substantially two layers 11 and 12, by the method described in my copending application, Serial No. 130,550, filed August 20, 1926, and, in operation, is similar to the machine shown in my copending application, Serial No. 130,551, filed August 20, 1926. The machine of this invention is in some aspects, an improvement over the machine of the latter application. The machine of this invention is constructed so that additional mechanisms may be added thereto, or some omitted in instances where it is very desirable to add operations or to omit them.

According to the methods described in the above noted applications, a conductor 10 is fed to the machine passing first through a straightening device wherein kinks, bends, etc., are taken out of the same and then fed through a rotary winding head, which winds strands of insulating material upon the conductor from a plurality of cops secured thereto, while the conductor is being fed along from one end of the machine to the other by suitable mechanism. The covered conductor is then fed respectively to a binding compound applicator and a compressing and polishing device. These operations are needed in order to apply a single layer of insulating material upon a conductor. In addition to the structure noted above, some form of driving mechanism and controls therefor are required. When a plurality of layers of insulating material is desired, additional mechanism is required, comprising a winding head, a compound applicator, and a polisher or compressor. A machine of this invention embodies features whereby these requirements may be readily provided by the provision of separable sections, each section being substantially an operable unit in itself, and being adapted to be inter-connected with others to form a complete machine when required.

As shown in the drawings the machine is sectional in character, including two sections, each of which comprises a set of operating mechanisms supported on a frame 13, as shown in Figs. 1 and 3, to which a similar section, as shown in Figs. 2 and 4, may be connected at either end thereof. Each of these two sections is substantially complete in itself and practically identical in structure with the other, and so the same reference characters are used on the drawings for most of the parts of both. At what will be known as the front end of the machine, a vertically directed standard 14 is provided, upon the outer face of which is secured a bracket 17, which supports a guide roller 18, and a wire straightening device 19. Below the bracket 17 and also secured to the end face of the standard 14 is a base 20, upon which are mounted fixed and loose pulleys 22 and 21, respectively, which are supported upon a shaft 23, and which are adapted to be driven by a power driven belt 24 from a power source, not shown. A chain sprocket wheel 25 is rotated by the shaft 23, being mounted thereon, and is rotatably connected by the chain 26 to a sprocket wheel 27 secured upon a shaft 28. The shaft 28 is journaled on the base 20 at 29 and 30, and adjacent the bearing 29 has a flat face wheel 31 secured thereto. A strap brake 32 engages the periphery of the wheel 31 under tension of a spring 33, which acts upon an arm 34, secured to the strap brake 32 and pivoted to a bracket 35 upon the base 20. An adjusting screw 36 is provided which may be manipulated in a well known manner to adjust the tension on the spring 33. A belt shifting bar 37 extends from the bracket 35 to another bracket 38, and is provided with transversely extending rods 39, which straddle the belt 24 and engage the same to shift it from one pulley to the other upon movement of the bar 37. Sleeves 40 are provided to connect the rods 39 to the bar 37, one of which is adapted to engage the arm 34 of the brake mechanism when the bar 37 is moved in the direction to shift the belt 24 to the fixed or tight pulley 22, and so release the brake by raising it from engagement with the periphery of the wheel 31, as shown by dotted lines in Fig. 1. The base 20 with the driving mechanism and brake device mounted thereon, is adapted to be connected to the front end face of any of the two or more sections having the frames 13, and the bracket 17 carrying the wire straightening device is likewise applicable to any of said sections at the front end thereof.

A hollow stud shaft 41 is journaled in the upper end of the standard 14, and a cop or cheese supporting head 42 is keyed or otherwise secured to this shaft. The head 42 is in the form of a disk and is provided with a belt groove 43 formed in the periphery thereof. Openings 44 are provided in the disk shape head between which are radially disposed spokes or arms 45. A cop or cheese bearing pin 46 extends outwardly substantially at right angles from the face of the head and from each spoke or arm 45. A cop or cheese containing a length of roving 47 wound upon a spool 49ª may be slipped longitudinally with respect to the axis of the head upon each of the pins 46, over a sleeve 49 which is rotatably mounted upon the pin 46, as shown in Fig. 16, and retained thereon by a collar 48 adapted to be secured to the pin 46 by a set screw. The spool or sleeve 49ª is adapted to tightly fit the sleeve 49. The sleeve 49 is provided with a flange 50 at one end. A pin 51 extends outwardly toward the end face of the head 42 from the flange 50, for a purpose to be hereinafter described. A sheet metal rim or flange 74 extends from the periphery of the head 42 axially over the cheeses of roving and surrounds the same. A belt 75 engages the head 42 in the groove 43 thereof and extends downwardly about a pulley 77, secured to a shaft 76. The shaft 76 is connected to the shaft 28 by any suitable type of coupling (not shown). The pulley 77 is provided with belt grooves of various diameters to permit the rotation of the head 42 at various speeds.

The frame 13 is provided with a rear end standard 52 and longitudinally directed members 53 and 54, which extend between the front standard 14 and the rear standard 52. Upon the upper member 53 and intermediate the standards 14 and 52, a platform 55 is provided upon which is adjustably mounted a compound receiving tank 56. Bearing pedestals 57 and 58 are provided upon the standard 52, in which the holder trunnions 59 and 60 of a rotatable polishing device are respectively journaled.

The tank 56 has a plurality of guideways 61 extending vertically and upwardly at each end thereof, in which posts 62 secured to the platform 55 are adapted to slide. The bottom of the tank 56 rests upon the hub 63 of a hand wheel 64, which is provided with a threaded opening 65. A threaded post 66 is secured to the platform 55 and engages the threads within the opening 65, whereby the tank 56 may be raised or lowered with respect to the platform 55 when the hand wheel 64 is rotated. A bearing arm 67 is secured to the side of the tank 56 and extends into the same and supports a bracket 68, a portion 69 of which forms a part of a compound pump. Another portion of the bracket 68 forms a sluiceway 70, in which the compound is received from the pump portion 69, and through which the insulation covered wire or cable passes. A shaft 71 is journaled in the arm 67 and has a pulley 72 secured to the outer end, and a bladed pump rotor 73 secured to the inner end thereof. The vertical adjustment above described, of the tank 56, permits the vertical adjustment of the sluiceway 70 toward and away from the wire or cable passing therethrough, to insure that the same is immersed in compound and becomes thoroughly impregnated thereby.

The pump portion 69 is provided with a peripheral passageway 78 in which blades 79 upon the rotor 73 are adapted to move to carry the compound upwardly to the sluiceway 70. An opening 80 leads from the passageway 78 to the sluiceway 70 to guide the compound thereto, and an end plate 81 of the rotor 73 closes the open passageway between the blades 79.

A belt 82 engages the pulley 72, and drives the same from a pulley 83 secured to a shaft 84, journaled in the sides of a gear box 85, mounted upon a platform 86 formed upon the lower supporting member 54. A worm wheel 87 is secured to the shaft 84 within the box 85 and meshes with a worm 88 secured to the shaft 76, which passes through the box 85 and to a bearing 89 upon the rear standard 52, through which it projects. A cover 90 is provided to close the upper part of the tank 56, and suitable end openings are provided in the cover 90 to allow the passage of the cable therethrough. An idler pulley 105 is pivotally secured to the box 85 and engages the belt 82 to insure proper tension thereof.

A wiping device comprising a pair of cooperating spring pressed fingers 91 and 92, mounted upon a disk 93, is provided and disposed within the tank 56. The disk 93 is secured to the end of the holder trunnion 59 and rotates therewith, the fingers 91 and 92 bearing against the covered wire or cable to wipe off or squeeze the excess compound therefrom, and to some extent smooth and condense the same.

The polishing device comprises a plurality of pairs of centrifugally operated members 94 and 95, which are respectively transversely slidable in longitudinally directed arms 96 and 97, connected to and disposed between the flanges 98 and 99 formed upon the trunnions 59 and 60, respectively. The members 94 and 95 are provided with opposing ends 100 and 101 respectively, which engage the cable upon opposite sides thereof and act thereon to mat and compress the insulation covering into a compact and dense mat, when the same are rotated thereabout. A chain sprocket wheel 102 is secured upon the end of the trunnion 60, and by means of a chain 103 is rotatably connected to a sprocket wheel 104, secured to the projecting end of the shaft 76. An idler sprocket wheel 106 is adjustably secured to the frame standard 52 to insure proper tension of the chain 103. The shaft 76 extends outwardly beyond the wheel 104 to allow the connection thereof with a corresponding shaft 107 of an adjacent section of the machine, such as shown in Fig. 2, or to a shaft 160 of a conductor feeding section shown in Figs. 2ᴬ and 4ᴬ. The shaft 107 is likewise extended beyond a corresponding wheel 104 of the section shown in Fig. 2, for like reasons.

A belt shifting rod 108 extends from the standard 14 to the standard 52, and is connected to the bar 37 by a coupling as at 108ª. The rod 108 extends beyond the standard 52 and is adapted to be coupled to a corresponding rod 109 of an adjacent section, which is bolted or otherwise secured to the first section, with its front end standard 14 abutting the rear standard 52 of the same, as shown in Fig. 2. A shifting bar operating lever 110 is pivoted at one end thereof to the lower supporting member 54 at 111, and extends outwardly and upwardly, within reach of the operator of the machine. An arm 112 secured to the lever 110, extends upwardly therefrom and engages the shifting rods 108 or 109 at 113, whereby the same may be manipulated to shift the belt 24 from one pulley to the other. One end of a spring 114 is connected to the lever 110, and the other end thereof is connected to the standard 52. The spring 114 operates, due to its tension, upon the lever 110 to urge the rods 108 or 109 and bar 37 in a direction whereby the belt 24 will tend to be shifted or retained upon the loose pulley 21. To prevent this action except when it is desired, a catch 115 is secured to the rods 108 or 109, and engages a slidable pawl 116, mounted on the standard 14, when the lever 110 is manipulated to move the rods 108 or 109 into a position whereby the belt 24 is upon the tight pulley 22. The release of such engagement places the spring 114 in operation to again shift the belt over upon the loose pulley 21.

The pawl 116 is secured to a slide 117, which is slidably mounted upon a base 118, secured to the standard 14. The slide 117 is guided in its movements by the cooperation of the pawl 116 with an opening 119 in a lug 120 upon the base 118 and by the cooperation of a stud 121 extending upwardly from the slide 117 with an opening 122 in a lug 123 also upon the base 118. A coiled spring 124 constantly urges the slide 117 downwardly against the lug 120. A rotatable rod 125 is journaled in the base 118 and extends the entire length of the section, being joined to a similar rod 126 of the adjacent section, as shown in Fig. 2. A camming member 127 is secured to the rod 125 and is disposed within an opening 128 in the slide 117. A flattened surface 129 upon the camming member 127 cooperates with a corresponding surface 130 of the opening 128, whereby rotation of the rods 125 or 126 will cause the camming member 127 to raise the slide 117 and thus draw the pawl 116 out of engagement with the catch 115. A handle 131 is secured to the rods 125 and 126, whereby the same may be rotated manually by an operator at either section of the machine.

A bracket 132 is mounted upon the heads 42 between each of the arms 45 so as to be disposed between the cheeses of roving upon the spindles 46. Each bracket 132 supports a slidable pin 133 which is radially disposed with respect to the axis of the head and which, in its lowermost position, is adapted to move a lever 134 extending upwardly and secured upon the rods 125 or 126. A pin 135 extending from the lever 134 is disposed in the path of the lower end of the pin 133, whereby it is engaged thereby to swing the lever 134, thus rotating the camming member 127 to release the catch 115 from the pawl 116. The pin 133 is retained against outward radial movement due to centrifugal force caused by the rapid rotation of the heads 42, by the engagement of an arm 136 of a bell crank 137, which is pivoted at 138 to the bracket 132, with a collar 139 secured to the pin 133. The other arm of the bell crank 137 has a roving engaging member 140 secured thereto, which when the machine is in operation lightly rides upon the strand of roving in such a manner that the arm 136 is retained in position to hold the pin 133 radially inward and out of possible engagement with the pin 135 on the lever 134. Interruption in the strand of roving due to breakage, or the like, will immediately release the pin 133 from the action of the arm 136, and the lever 134 will be engaged to release the catch 115 from the pawl 116 whereby the belt shifting rods 108 or 109 will be moved by the spring 114 to shift the belt 24 on to the loose pulley 21 and causing the operation of the brake 32 to stop the machine.

It may be desired to operate the machine with one or more cheeses of roving removed from the head 42. Under such circumstances, the pin 133 normally controlled by the omitted cheeses will not be retained in an operative position by the strand of roving, through the agency of the crank arm 137, and the operation of the machine would not be permitted. Means to retain pins 133 under the above conditions is provided, and comprises a bell crank 141 pivoted at 142 to the bracket 132. An arm 143 extends substantially radially with respect to the axis of the head, and is provided with an end portion 144, which is adapted to move to a position over the outer end of the pin 133 when the crank 141 is rotated in one direction, and to release the pin from such engagement when the crank is moved into another position. The bell crank 141 is manually moved into pin engaging position when the machine is set up. The other arm 145 of the bell crank 141 extends towards the spindle 46 that holds the cheese of roving, with its end lying in the path of the pin 51 extending from the flange 50 upon the sleeve 49, when the latter is upon the spindle 46. The arm 145, therefore, insures that the arm 143 will be moved to disengage the portion 144 thereof from the pin 133 when a cheese of roving is placed upon a spindle 46 previously empty, the pin 51 during the first revolution of the corresponding cheese engaging the arm 145 to swing the crank 141 into releasing position with respect to the pin 133.

A brake band 146 is swingably mounted upon a stud 147, secured to the bracket 132 and is urged into engagement with the periphery of an adjacent cheese of roving by a wire spring 148. The spring 148 is coiled about the stud 147 with one end thereof secured thereto, the other end being secured to a member 149 to which brake band 146 is secured. The stud 147 is adjustably journaled in an extending portion 150 of the bracket 132, being secured therein by means of a set screw 151. By loosening the set screw 151, the stud 147 may be rotated to adjust the tension of the spring 148 so as to provide a sufficient amount of pressure to the brake band 146 upon the cheese to prevent the same from spinning or from running when the machine is in operation, thereby keeping the strand of roving taut.

The mechanism selected to illustrate the conductor feeding means above mentioned, comprises, in this instance, a windlass section which may be operably connected to either of the shafts 76 or 107 by coupling the same to a shaft 160 by means of a coupling member 161. Secured upon the shaft 160 is a worm 162 in mesh with a worm wheel 163 secured upon a shaft 164 upon which is a removable gear 165 of a set of change gears 165 and 166. The gear 166 is removaly secured to a shaft 167, upon which is secured a pinion 168 which meshes with a gear 169 rotatably mounted upon a stud shaft 170. The gear 169 is bolted to a windlass drum 171, which is also rotatably mounted upon the stud shaft 170. By a proper combination of change gears 165 and 166, the speed of the drum 171 may be adjusted to vary the speed at which the conductor 10 is fed through the machine sections preceding this windlass.

A base 172 is provided to support the operable parts of the windlass section above described. Upon this base is a bracket 173 which rotatably supports the shaft 164. The bracket 173 is slidably mounted upon the base 172, thereby permitting the use of different diameter change gears. The worm 162 slides with this bracket while in continuous driving engagement with the shaft 160.

The conductor 10 received from any suitable source of supply is fed through the straightening device 19 and is then passed through the hollow shaft 41 and axially through the head 42. After passing through the head 42, the conductor is fed through the compound applying mechanism, being disposed within the sluiceway 70 thereof, passing through the same substantially parallel to the axis of the machine, and without being bent or curved. The conductor is then passed between the spring pressed fingers 91 and 92 of the wiping mechanism and through the hollow trunnion 59 into the polishing device, where it is threaded between the opposed ends 100 and 101 of the centrifugally operated members 94 and 95. The conductor then passes through the hollow trunnion 60 and on to and about the windlass drum 171, or when required, through a similar set of mechanisms as above described and then to the windlass or other suitable winding and feeding means. Generally, a short length of scrap conductor is used for this initial setting up of the machine. Due to the structure and novel arrangement of these devices, the conductor extends through the machine in substantially a straight line and is not appreciably distorted during its passage therethrough after it leaves the straightening device. This feature insures that there will be no tendency to destroy the electrical conductivity and mechanical strength of the conductor while it is being insulated.

After the disposition of the conductor as above outlined, the required number of cheeses of roving 47 are mounted upon the pins 46 in the heads 42, and the strands of roving from each cheese or cop are threaded beneath an adjacent roving engaging member 140. The machine is now provided with power by shifting the belt 24 from the loose pulley 21 to the tight pulley 22 upon the shaft 23 by the proper manipulation of the shifting bar 37, by the operating lever 110. The movement of the shifting bar 37 causes the sleeve 40 to engage the arm 34 of the brake 32 to move it into the dotted position shown in Fig. 1, where it is in inoperative position and under tension of the spring 33, and released from engagement with the wheel 31. The arm 34 is retained in brake releasing position due to the bar 37 being retained in power applying position by means of the cooperation and engagement of the pawl 116 with the catch 115.

The strands of roving are now started over the conductor, and the rotation of the head about the same winds the roving thereon. The windlass being in operation, immediately starts to feed the conductor longitudinally of the machine, and the first layer of insulation 11 is applied to the conductor 10 in long helical windings, with the strands of roving generally disposed in juxtaposed relation about the conductor. The compound pump being in operation discharges compound into the sluiceway 70 and of a sufficient amount to completely submerge the covered conductor therein, whereby the insulation covering will be impregnated therewith. The wiping device through the agency of the fingers 91 and 92, which rotate about and in engagement with the conductor, wipes any surplus compound from the same and initially intermingles and compresses the fibres of the strands of roving and the strands into closer relation with each other.

The polishing and compressing device now engages the covered conductor and due to the centrifugal force caused by the rapid rotation of the same, the opposing ends 100 and 101 of the members 94 and 95 press against the conductor therebetween. The ends 100 and 101, due to this pressure upon the compound filled covering, efficiently and rapidly intermingle, mat, compress and smooth the same into a dense and compact mass, which when dry, is of sufficient hardness and toughness to withstand rough usage. Due to the nature of the compound used, the covering is substantially dry when it leaves the polishing device.

When another layer 12 is required for the conductor 10, another machine section is bolted to the first, as above described, and a similar series of operations is performed continuously upon the conductor without removing the same from the machine. Generally, the heads 42 of a machine wherein more than one layer of insulation is applied to a conductor, are rotatable in opposite directions so as to apply the second layer 12 upon the conductor reversely to the first layer 11.

By the above described machine, the advantages enumerated in the above mentioned objects as contemplated improvements in machines of this type, are obtained, and an insulation is formed about the conductor of continuous length which will be substantially a one-piece structure of uniform thickness throughout and comprised of a dense mass of the intermingling fibres of strands of untwisted roving, which are preferably composed initially of loosely intermingled fibres having a reinforcing thread embodied therein. In some instances, the cheeses or cops may have strands of insulating material other than the preferred form thereon, which during the application thereof upon a conductor will not require the use of the compound applicator or polishing device or both. In such instances, either may be disconnected from the power source so as not to be operated thereby, or either may be entirely removed from the machine.

By the provision of the sheet metal rim or flange 74 which extends axially over the cheeses of roving mounted upon the head 42, the circulation of air, caused by the rapid rotation of the head, is prevented from interfering with the proper operation of the machine, due to possibly rupturing the fragile roving as it leaves the cheeses in a single strand and moves toward the conductor. Considerable air pressure is developed by the rapid rotation of the head 42 with the cheeses thereon which, unless controlled, as for instance, by the above means, would prevent the operation of the machine in an efficient manner.

While I have shown and described a preferred embodiment of my invention, it will be understood that the same is not to be limited thereto in all of its details, as modifications and variations are possible which will lie within the spirit of the invention and the scope of the appended claims.

What I claim is:

1. A machine for applying an insulating covering to a conductor or the like, comprising a frame adapted at the end thereof to be secured to a similar frame, to align the operable parts of each, rotatable means on said frame adapted to receive a plurality of cops, each containing a strand of insulating material, and means to rotate said rotatable means to wind said strands about a conductor.

2. A machine for applying an insulating covering to a conductor or the like, comprising a frame adapted at the end thereof to be secured to a similar frame to align the operable parts of each, rotatable means on said frame adapted to receive a plurality of cops, each containing a strand of insulating material, and means to rotate said rotatable means to wind said strands about a conductor, and means to feed the conductor axially with respect to the axis of said rotatable means.

3. A machine for applying an insulating covering to a conductor or the like, comprising a frame having a rotatable head mounted thereon with its axis in a horizontal plane, said head being adapted to receive a plurality of cops, each containing a strand of insulating material, another frame having a similar rotatable head thereon, said frames being securable together in such a manner that one precedes the other and the axes of said heads are in alignment whereby the conductor to be covered passes from one to the other axially with respect to the axes of said heads.

4. A machine for applying an insulating covering to a conductor or the like, comprising a frame having a rotatable head mounted thereon with its axis in a horizontal plane, said head being adapted to receive a plurality of cops, each containing a strand of insulating material, another frame having a similar rotatable head thereon, said frames being securable together in such a manner that one precedes the other and the axes of said heads are in alignment whereby the conductor to be covered passes from one to the other axially with respect to the axes of said heads, each of said frames being adapted to be secured to a conductor feeding means at one end thereof.

5. A machine for applying an insulating covering to a conductor or the like comprising a frame, a rotatable head having a cop of insulating material thereon, the axis of said cop being spaced from and parallel with the axis of said head, means to rotate said head to revolve said cop about the conductor to wind insulating material thereon, a compound applying device having an axially disposed sluiceway, said sluiceway being adapted to receive the conductor axially disposed therein, and in alignment with the axis of said head, said frame being adapted at each end thereof for connection with a similar frame, and means to feed the conductor longitudinally with respect to said machine and respectively through said head and said compound applying device.

6. A machine for applying an insulating covering to a conductor or the like comprising a frame, a rotatable head having a cop of insulating material thereon, the axis of said cop being spaced from and parallel with the axis of said head, means to rotate said head to revolve said cop about the conductor to wind insulating material thereon, a compound applying device having an axially disposed sluiceway in alignment with the axis of said head, said sluiceway being adapted to receive the conductor axially disposed therein, and wiping means engaging the conductor as it leaves said sluiceway to relieve the same of surplus compound and another frame having like parts and mechanisms mounted thereon, said last mentioned frame being adapted to be detachably secured to the first mentioned frame to align the axes of the mechanisms on each of said frames, and means to feed the conductor longitudinally with respect to said machine and in a straight line respectively through said head, said compound applying device and said wiping means mounted upon each of said frames.

7. A machine for applying an insulating covering to a conductor or the like comprising a frame, a rotatable head having a cop of insulating material thereon, the axis of said cop being spaced from and parallel with the axis of said head, means to rotate said head to revolve said cop about the conductor to wind insulating material thereon, a compound applying device having an axially disposed sluiceway in alignment with the axis of said head, said sluiceway being adapted to receive the conductor axially disposed therein, wiping means engaging the conductor as it leaves said sluiceway to relieve the same of surplus compound, a polishing device in alignment with the axis of said head and having means to press against the conductor to compress the insulation thereon into a compact mass and to smooth the same, said frame being adapted at each end thereof for connection with a similar frame, and means to feed the conductor longitudinally with respect to said machine in a straight line and successively through said head, said compound applying device, said wiping means, and said polishing device.

8. A machine for applying an insulating covering to a conductor or the like comprising a frame, a rotatable head having a cop of insulating material thereon, the axis of said cop being spaced from and parallel with the axis of said head, means to rotate said head to revolve said cop about the conductor to wind insulating material thereon, a compound applying device having an axially disposed sluiceway in alignment with the axis of said head, said sluiceway being adapted to receive the conductor axially disposed therein, a polishing device in alignment with the axis of said head and having means to press against the conductor to compress the insulation thereon into a compact mass and to smooth the same, said frame being adapted at each end thereof for connection with a similar frame, power driving means for said mechanisms secured to one end of said first mentioned frame, and means to feed the conductor longitudinally with respect to said machine in a straight line, and successively through said head and said polishing device.

9. A machine for applying an insulating covering to a conductor or the like comprising a frame, a rotatable head having a cop of insulating material thereon, the axis of said cop being spaced from and parallel with the axis of said head, means to rotate said head to revolve said cop about the conductor to wind insulating material thereon, a compound applying device having an axially disposed sluiceway, said sluiceway being adapted to receive the conductor axially disposed therein, said sluiceway being adjustable toward and away from the axis of the conductor advancing therethrough, to insure the alignment of the conductor with the axis of said head and another frame having like parts and mechanisms mounted thereon, said last mentioned frame being adapted to be detachably secured to the first mentioned frame to align the axes of the mechanisms on each of said frames, and means to feed the conductor successively through the mechanisms on both of said frames.

10. In a machine for covering a conductor with insulation material in the form of a continuous strand, the combination of a rotatable head having a supply of material thereon and being adapted to wind the same upon a conductor, a compound applying device comprising a compound receiving tank and a horizontally disposed sluiceway therein, said sluiceway being in alignment with the axis of said head, and disposed above the level of the compound in said tank means to draw the conductor through said sluiceway within said tank, and means to continuously supply said sluiceway with compound from said tank.

11. In a machine for covering a conductor with insulation material in the form of a continuous strand, the combination of a rotatable head having a supply of material thereon and being adapted to wind the same upon a conductor, a compound applying device comprising a compound receiving tank and a horizontally disposed sluiceway therein, said sluiceway being in alignment with the axis of said head, and disposed above the level of the compound in said tank, means to draw the conductor through said sluiceway within said tank, and means to continuously supply said sluiceway with compound from said tank, said sluiceway being in communication with said tank to receive compound therefrom by the action of said supplying means and to discharge surplus compound therein.

12. In a machine for insulating electrical conductors, a frame, a rotatable cop receiving head mounted upon one end of said frame, an insulation condensing device mounted adjacent the other end of said frame, a compound applicator mounted intermediate the ends of said frame, said frame being adapted at each end thereof for connection with a similar frame, and being adapted at one end for connection with the frame of a conductor feeding device.

13. In a machine for insulating electrical conductors, a frame, a rotatable cop receiving head mounted upon one end of said frame, an insulation condensing device mounted adjacent the other end of said frame, a compound applicator mounted intermediate the ends of said frame, said frame being adapted at each end thereof for connection with a similar frame and being adapted at one end for connection with the frame of a conductor feeding device, and being adapted to have a wire straightening device connected to the other end thereof.

14. In a machine for insulating electrical conductors, a frame, a rotatable cop receiving head mounted upon one end of said frame, an insulation condensing device mounted adjacent the other end of said frame, a compound applicator mounted intermediate the ends of said frame, said frame being adapted at each end thereof for connection with a similar frame, and being adapted at one end for connection with the frame of a conductor feeding device, and being adapted to have a wire straightening device connected to the upper portion, and a power driving device connected to the lower portion of the other end thereof.

15. In a machine for insulating electrical conductors, a frame, a rotatable cop receiving head mounted upon one end of said frame, an insulation condensing device mounted adjacent the other end of said frame, a compound applicator mounted intermediate the ends of said frame, the operating parts of said condensing device and said applicator being in alignment with the axis of said head to permit the conductor to pass through said machine in a straight line, said frame being adapted at each end thereof for connection with a similar frame, and being adapted at one end for connection with the frame of a conductor feeding device.

16. In a machine for insulating electrical conductors, a frame, a rotatable cop receiving head mounted upon one end of said frame, an insulation condensing device mounted adjacent the other end of said frame, a compound applicator mounted intermediate the ends of said frame, the operating parts of said condensing device and said applicator being in alignment with the axis of said head, said frame being adapted at each end thereof for connection with a similar frame, and to dispose the corresponding parts on the second mentioned frame in alignment with the axis of the head on said first mentioned frame to permit the conductor to pass through said machine in a straight line.

17. In a machine for insulating electrical conductors, a frame, a rotatable cop receiving head mounted upon one end of said frame, an insulation condensing device mounted adjacent the other end of said frame, a compound applicator mounted intermediate the ends of said frame, the operating parts of said condensing device and said applicator being in alignment with the axis of said head, said frame being adapted at each end thereof for connection with a similar frame and to dispose the corresponding parts on the second mentioned frame in alignment with the axis of the head on said first mentioned frame, to permit the conductor to pass through said machine in a straight line, a wire straightening device connected to the front end of said first mentioned frame with the operating parts thereof in alignment with the axis of the head on said first mentioned frame.

18. A machine for insulating electrical conductors, comprising a frame having end uprights, a cop receiving head rotatably mounted adjacent the front end upright, a fibre condensing device mounted upon said frame adjacent its rear end upright, a wire straightening device secured to the upper portion of said front end upright, power means and brake means mounted below said straightening device on said front end upright, and means drivingly connecting the operable parts of said machine with said power means.

19. A machine for insulating electrical conductors, comprising a frame having end uprights, a cop receiving head rotatably mounted adjacent the front end upright; a fibre condensing device mounted upon said frame adjacent its rear end upright, a wire straightening device secured to the upper portion of said front end upright, power means and brake means mounted below said straightening device on said front end upright, a driving shaft mounted on said frame below said head and extending between said end uprights, means drivingly connecting the operable parts of said machine with said shaft, and controllable means drivingly connecting said shaft with said power means, said controllable means being mounted on the front end upright.

20. A machine for insulating electrical conductors, comprising a frame having end uprights, a cop receiving head rotatably mounted adjacent the front end upright, a fibre condensing device mounted upon said frame adjacent its rear end upright, a wire straightening device secured to the upper portion of said front end upright, power means and brake means mounted below said straightening device on said front end upright, a driving shaft mounted on said frame below said head and extending between said end uprights, means drivingly connecting the operable parts of said machine with said shaft, and controllable means drivingly connecting said shaft with said power means, means extending between said end uprights for controlling said controllable means and associated with said brake means to control the operation thereof, said controllable means being mounted on the front end upright.

21. A machine for insulating electrical conductors, comprising a frame having end uprights, a cop receiving head rotatably mounted adjacent the front end upright, a compound applicator mounted upon said frame intermediate said end uprights, an insulation smoothing device mounted upon said frame adjacent its rear end upright, a wire straightening device secured to the upper portion of said front end upright, and power means mounted below said straightening device on said front end upright, a driving shaft mounted on said frame below said head and extending between said uprights, means drivingly connecting the operable parts of said machine with said shaft, brake means associated with an end of said shaft, and controllable means drivingly connecting said shaft with said power means, means extending between said uprights for controlling said controllable means and associated with said brake means to control the operation thereof, said controllable means and said brake means being mounted upon the front end upright below said straightening device.

22. A machine for insulating electrical conductors, comprising a frame having end uprights, a cop receiving head rotatably mounted adjacent the front end upright, a fibre condensing device mounted upon said frame adjacent its rear end upright, a wire straightening device secured to the upper portion of said front end upright, power means and brake means mounted below said straightening device on said front end upright, a driving shaft mounted on said frame below said head and extending between said end uprights, means drivingly connecting the operable parts of said machine with said shaft, and controllable means drivingly connecting said shaft with said power means, means extending between said end uprights for controlling said controllable means and associated with said brake means to control the operation thereof, said controllable means being mounted on the front end upright, a similar frame having its front end upright connected to the rear end upright of said first mentioned frame, with the axes of the heads, the shafts and the controlling means mounted on each frame in alignment, and a conductor feeding means driven by said power means and being under the control of said brake means connected to the rear end upright of said last mentioned frame.

23. A machine for insulating a conductor or the like comprising the combination of a frame, a rotatable winding means mounted upon said frame and adapted to apply a strand of insulating material to a conductor disposed in alignment with the axis of said winding means, compound applying means to apply a compound to and upon the material applied to the conductor while the conductor is retained in the aforesaid alignment, said compound applying means including a sluiceway in alignment with the axis of said winding means, a compound retainer disposed below and in communication with said sluiceway, and means to supply said sluiceway with compound from said retainer, means to feed the covered conductor through said compound applying means, and means to operate said winding means, said compound supplying means and said conductor feeding means at predetermined relative speeds whereby the compound in said sluiceway will be continuously sufficient to cover the conductor passing therethrough.

24. In a machine for insulating electrical conductors, a frame, a rotatable insulation winding head mounted upon one end of said frame, an insulation condensing device mounted adjacent the other end of said frame, a compound applicator mounted intermediate the ends of said frame, the axes of said parts being in alignment to permit a conductor to be fed therethrough without bending the same, said frame being adapted at each end thereof for connection with a similar frame having similar parts thereon to align the axes of the parts on the first frame with those on the second.

25. In a machine for covering a conductor with insulation material, the combination of a rotatable head having a supply of strand material thereon and being adapted to wind the same upon a conductor, a compound applying device comprising a compound retaining tank and a horizontally disposed sluiceway within said tank, said sluiceway being open at both ends thereof to permit the discharge of compound therefrom and being open at the top to receive compound from said tank, said sluiceway being disposed in said tank in alignment with the axis of said head whereby the conductor may be drawn therethrough from one end to the other thereof, and being disposed above the level of the compound in said tank, and means to raise compound from said tank and discharge the same into the top of said sluiceway to continuously supply the same therewith.

26. In a conductor insulating machine, a rotatable head adapted to contain and apply a supply of insulating material upon a conductor, an insulating material pressing device adapted to receive the conductor in alignment with the axis of said head, a compound applicator disposed between said head and said material pressing device, said applicator having a sluiceway therein adapted to receive the conductor as it passes through said applicator in alignment with the axis of said head, means to supply compound to said sluiceway from a supply thereof, and means to adjust said sluiceway with respect to the conductor to insure the immersion of the conductor in compound in said sluiceway during its passage therethrough.

27. In a conductor insulating machine, a rotatable head adapted to contain and apply a supply of insulating material upon a conductor, a compound applicator, an insulation material pressing device, all of the aforesaid devices being adapted to permit the passage of a conductor therethrough and in a straight line concentric to the axis of said head, said compound applicator including a sluiceway adapted to permit the conductor to pass in a straight line therethrough, to receive compound from a supply thereof and to discharge surplus compound back into the supply, means to continuously feed compound to said sluiceway and means to adjust said sluiceway with respect to the conductor to insure immersion of the conductor in the compound in said sluiceway.

In witness whereof, I have hereunto set my hand this 10th day of January, 1927.

BEAUFORD H. REEVES.